J. D. SWIRES.
FASTENER.
APPLICATION FILED NOV. 6, 1920.
1,391,218.
Patented Sept. 20, 1921.
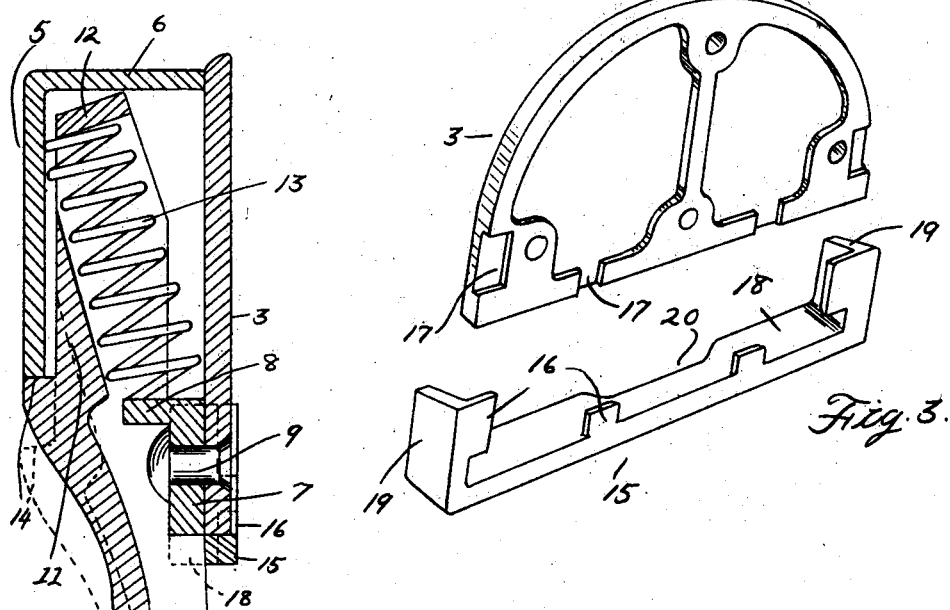
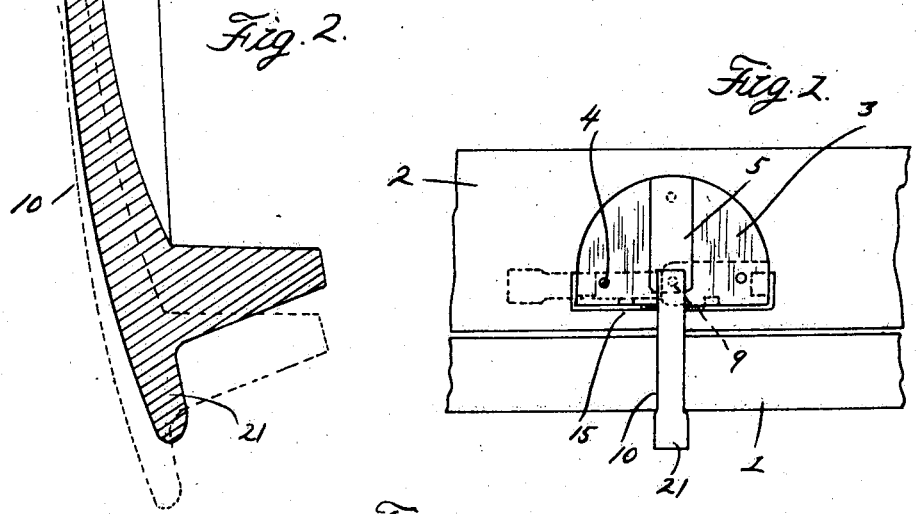
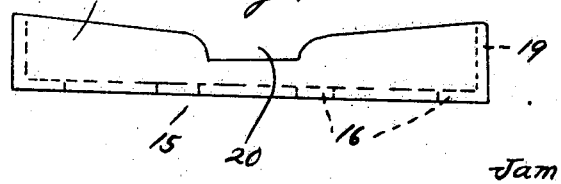
Inventor
James D. Swires
By Whittemore Hulbert & Whittemore
Attorneys

UNITED STATES PATENT OFFICE.

JAMES D. SWIRES, OF DETROIT, MICHIGAN, ASSIGNOR OF ONE-HALF TO ANDREW HARRIS, OF DETROIT, MICHIGAN.

FASTENER.

1,391,218.  Specification of Letters Patent.  Patented Sept. 20, 1921.

Application filed November 6, 1920. Serial No. 422,184.

*To all whom it may concern:*

Be it known that I, JAMES D. SWIRES, a citizen of the United States of America, residing at Detroit, in the county of Wayne, and State of Michigan, have invented certain new and useful Improvements in Fasteners, of which the following is a specification, reference being had therein to the accompanying drawings.

The invention relates to fastening devices and refers more particularly to devices for securing end or side gates to vehicle bodies. One of the objects of the invention is to provide an improved construction of fastening device which will secure a gate to a vehicle body to prevent accidental separation of the gate from the body and also rattling, and which is provided with means for readily releasing the fastening device from the body. Other objects of the invention reside in the novel features of construction as more fully hereinafter set forth.

In the drawings:

Figure 1 is a rear elevation of a portion of a vehicle body with my fastening device applied;

Fig. 2 is a longitudinal section through the fastening device;

Fig. 3 is a perspective view showing the base and cam member of the fastening device in separated relation;

Fig. 4 is an end view of the cam member.

The vehicle body has the flooring 1 upon which is removably mounted the lower slat or bar 2 forming part of a gate, which may be of any usual construction. In order to prevent the gate from becoming accidentally disengaged from the body and also to prevent rattling, there is the following construction: 3 is a base adapted to be secured to the lower slat or bar 2 as by means of the screws 4. 5 is a hollow U-shaped body opening toward the base 3 and having its end 6 closed. 7 is a cross bar between the outer edges of the side flanges of the hollow body and at the opposite end thereof from the closed end 6. This cross bar is preferably integral with the hollow body and has the outwardly extending flange 8 and also is pivotally connected to the base 3 as by the rivet 9.

10 is a hook having the shank 11 passing through the open end of the hollow body 5 between the cross bar 7 and the back of the body and extending longitudinally within the body. This shank is U-shaped and has the cross bar 12 at its inner end. 13 is a coil spring lying within the shank and abutting the cross bar 12 and the flange 8 of the cross bar 7. 14 is a shoulder upon the shank 13 engageable with the end of the back of the hollow body 5 to limit inward movement of the shank relative to the hollow body.

With this arrangement, the coil spring 13 being inclined relative to the longitudinal axis of the hollow body 5 tends to longitudinally move the hook 10 toward the hollow body and also tends to move the hook transversely inward with respect to the hollow body, to occupy the position shown in full lines in Fig. 2. The construction is such however, that the hook may be moved longitudinally away from the hollow body to occupy the position shown in dotted lines in Fig. 2 to compensate for variations between the hollow body and the bottom of the flooring 1. Furthermore, the construction will permit of swinging the hook 10 transversely outward to clear the edge of the flooring 1 and release the fastener therefrom.

For the purpose of readily releasing the fastening device from the flooring, I have provided the cam member 15 which extends adjacent to the lower edge of the base 3. This cam member 15 has the transversely extending projections 16 which fit in correspondingly located recesses 17 in the lower face of the base so that when the base is secured to the slat or bar 2, the cam member will be firmly clamped in place. This cam member has the outwardly extending flange 18 adjacent to the lower edge of the base 3 and the transversely extending outward flange 19 at the opposite sides of the base. The flange 18 is provided with the centrally located recess 20 in its outer edge which is of a width to be engaged in by the shank of the hook 10. The outer edges of this flange 18 are preferably inclined downward toward the recess 20 from the outer edges of the flanges 19 and the sides of the recess are curved so that upon rotation of the body 5 the hook 10 will be immediately released from the flooring 1 by the hook riding over the curved edge. Upon continued rotative movement of the hollow body and hook, one side of the hollow body will engage the flange 18 of the cam member and thereby limit the rotation of the same. The hook is preferably provided with projection 21 at its lower end to permit of readily gripping the same for rotation.

What I claim as my invention is:

1. In a fastener, the combination with a body, of a hook movable angularly and transversely with respect to said body, means for yieldingly moving said hook transversely in one direction, and a cam member for moving said hook transversely in the opposite direction upon relative angular movement of said body and cam member.

2. In a fastener, the combination with a body, of a hook rotatable therewith and movable transversely of the path of rotation thereof, means for yieldably moving said hook transversely in one direction, and a cam member engaging said hook for moving the same transversely in the opposite direction upon rotation of said body.

3. The combination with a pair of members, of a fastener, comprising a body rotatably secured to one of said members, a hook rotatable with said body and movable transversely of the path of rotation thereof, means for yieldably moving said hook transversely into engagement with the other of said members, and a cam member upon said member to which said body is secured, said cam member engaging said hook for moving the same transversely out of engagement with the other of said members.

4. In a fastener, the combination with a base, of a body rotatably mounted upon said base, a hook upon said body movable transversely of the path of rotation thereof, means for yieldably moving said hook transversely in one direction, and a cam member secured to said base for moving said hook in the opposite direction, upon rotation of said body.

5. The combination with a support, of a fastener, comprising a base secured to said support, a body rotatably mounted upon said base, a hook upon said body movable longitudinally and transversely of the path of rotation thereof, means for yieldably moving said hook longitudinally in one direction and transversely in one direction, and a cam member having transversely extending projections engaging in said base, said cam member being engaged by said hook and adapted to move said hook transversely in the opposite direction upon rotation of said body.

In testimony whereof I affix my signature.

JAMES D. SWIRES.